(12) United States Patent
Hirt et al.

(10) Patent No.: US 12,135,206 B2
(45) Date of Patent: Nov. 5, 2024

(54) METHOD FOR DETERMINING ACTUAL STATE VALUES

(71) Applicant: ebm-papst St. Georgen GmbH & Co. KG, St. Georgen (DE)

(72) Inventors: Markus Hirt, Villingen-Schwenningen (DE); Frank Jeske, St. Georgen (DE); Jörg Hornberger, Dornstetten-Aach (DE); Manfred Bitzer, St. Georgen (DE)

(73) Assignee: ebm-papst St. Georgen GmbH & Co. KG, St. Georgen (DE)

( * ) Notice: Subject to any disclaimer, the term of this patent is extended or adjusted under 35 U.S.C. 154(b) by 697 days.

(21) Appl. No.: 17/285,197

(22) PCT Filed: Jun. 4, 2019

(86) PCT No.: PCT/EP2019/064412
§ 371 (c)(1),
(2) Date: Apr. 14, 2021

(87) PCT Pub. No.: WO2020/083536
PCT Pub. Date: Apr. 30, 2020

(65) Prior Publication Data
US 2022/0065623 A1 Mar. 3, 2022

(30) Foreign Application Priority Data
Oct. 25, 2018 (DE) .................. 10 2018 126 705.3

(51) Int. Cl.
*G01B 21/22* (2006.01)
*B60K 1/02* (2006.01)
(Continued)

(52) U.S. Cl.
CPC ............... *G01B 21/22* (2013.01); *B60K 1/02* (2013.01); *B60K 7/0007* (2013.01);
(Continued)

(58) Field of Classification Search
None
See application file for complete search history.

(56) References Cited

U.S. PATENT DOCUMENTS 5,596,252 A * 1/1997 Shimizu ............... B62D 5/0463
318/432
9,499,260 B2 * 11/2016 Christensen .......... B64C 25/405
(Continued)

FOREIGN PATENT DOCUMENTS

DE 60103191 T2 1/2005
DE 102005058400 A1 5/2007
(Continued)

OTHER PUBLICATIONS

European Patent Office, Rijswijk, Netherlands, International Search Report of International Application No. PCT/EP/2019/064412, Mailed Sep. 6, 2019, 2 pages.

*Primary Examiner* — Hunter B Lonsberry
*Assistant Examiner* — Robert Louis Pinkerton
(74) *Attorney, Agent, or Firm* — Dickinson Wright PLLC

(57) ABSTRACT

A method for determining state values of a wheel (R) of a wheel drive module that includes the wheel (R), a speed modulation gearbox (G), a first electric motor (M1) and a second electric motor (M2), as well as at least one first sensor (S1) for sensing state values of the first electric motor (M1), at least one second sensor (S2) for sensing state values of the second electric motor (M2), wherein additional state value sources of the electric motors (M1, M2) and/or the wheel (R) are provided and the sensed state values are compared with each other in order to compensate for and to recognize errors in the sensing of the state values so that actual state values of the wheel (R) are determined from the individual sensed state values.

20 Claims, 2 Drawing Sheets

(51) Int. Cl.
  *B60K 7/00*   (2006.01)
  *B60K 17/04*  (2006.01)
  *B60K 17/30*  (2006.01)
  *B60L 15/20*  (2006.01)
  *B62D 15/02*  (2006.01)
  *G01P 3/00*   (2006.01)

(52) U.S. Cl.
  CPC ............ *B60K 17/043* (2013.01); *B60K 17/30* (2013.01); *B60L 15/20* (2013.01); *B62D 15/024* (2013.01); *G01P 3/00* (2013.01); *B60K 2007/003* (2013.01)

(56) References Cited

U.S. PATENT DOCUMENTS

| | | | | |
|---|---|---|---|---|
| 10,112,703 | B2 * | 10/2018 | Wilson | F16H 57/01 |
| 10,442,310 | B1 * | 10/2019 | Drako | B60K 17/145 |
| 10,864,984 | B2 * | 12/2020 | Didey | F16H 1/06 |
| 2001/0008985 | A1 * | 7/2001 | Wada | G05D 1/0272 |
| | | | | 701/1 |
| 2010/0206647 | A1 * | 8/2010 | Ishii | B62D 9/00 |
| | | | | 180/6.24 |
| 2011/0238251 | A1 * | 9/2011 | Wright | B60W 30/18172 |
| | | | | 701/22 |
| 2013/0144476 | A1 * | 6/2013 | Pinto | B60T 8/17555 |
| | | | | 903/930 |
| 2013/0261864 | A1 * | 10/2013 | Noguchi | B60L 15/2072 |
| | | | | 701/22 |
| 2013/0333966 | A1 * | 12/2013 | Bryant | B60K 17/30 |
| | | | | 180/65.51 |
| 2017/0072997 | A1 * | 3/2017 | Oh | B62D 5/09 |
| 2017/0210414 | A1 * | 7/2017 | Sato | B60W 10/20 |
| 2017/0259811 | A1 * | 9/2017 | Coulter | B60W 30/143 |
| 2018/0056985 | A1 * | 3/2018 | Coulter | B60K 7/0007 |
| 2019/0195328 | A1 * | 6/2019 | Koyama | B60K 17/16 |

FOREIGN PATENT DOCUMENTS

| | | | | |
|---|---|---|---|---|
| DE | 202008004190 U1 | 6/2008 | | |
| DE | 102016007445 A1 | 12/2017 | | |
| JP | S62128833 A | 6/1987 | | |
| JP | 2017081247 A | * 5/2017 | ........... | B60N 2/2352 |
| WO | 2012171589 A1 | 12/2012 | | |

* cited by examiner

METHOD FOR DETERMINING ACTUAL STATE VALUES

CROSS REFERENCE TO RELATED APPLICATIONS

This application is a 35 U.S.C. § 371 national phase application of International Application No.: PCT/EP2019/064412, filed Jun. 4, 2019, which claims the benefit of priority under 35 U.S.C. § 119 to German Patent Application No.: 10 2018 126 705.3, filed Oct. 25, 2018, the contents of which are incorporated herein by reference in their entirety.

FIELD

The invention relates to a method for determining actual or validated state values in a wheel drive module.

BACKGROUND

The statements in this section merely provide background information related to the present disclosure and several definitions for terms used in the present disclosure and may not constitute prior art.

A plurality of methods is already known for determining sensor data or state values. If, for a transfer or further processing of such state values, it is to be ensured that the determined state values are in agreement with the actual state values, it is common practice in the applications known in the prior art to use certified sensors or state value sources which, due to prior testing and appropriate design, reliably determine and transfer the actual state values. However, the design, production and subsequent certification of such sensors or state value sources is involved and cost intensive. Systems in which such certified components and in particular a number of such components are used are as a result also cost intensive in terms of their production.

This applies in particular to a wheel drive module, in which, for the calculation of the driving and steering movements of a wheel of the wheel drive module, the current steering angle thereof and the current rotational speed thereof are to be determined.

SUMMARY

An underlying object of the present disclosure is to overcome the aforementioned disadvantages and to provide a method for determining actual state values of a wheel of a wheel drive module, in which the individual information sources do not have to have any special validation but in which the determined state values nevertheless correspond to the actual state values.

This object is achieved by the combination of features in a method for determining state values of a wheel (R) of a wheel drive module comprising the wheel (R), a speed modulation gearbox (G), a first electric motor (M1) and a second electric motor (M2), as well as at least one first sensor (S1) for sensing state values of the first electric motor (M1), at least one second sensor (S2) for sensing state values of the second electric motor (M2), wherein the wheel drive module furthermore comprises at least one third sensor (S3) for sensing state values of the wheel (R), and/or a fourth and fifth sensor (S4, S5), and the fourth sensor (S4) senses state values of the first electric motor (M1), and the fifth sensor (S5) senses state values of the second electric motor (M2), wherein the first and the second electric motors (M1, M2) are designed to drive the wheel (R) jointly by means of the speed modulation gearbox (G) about a wheel axis (A) and to steer it about a steering axis (L) orthogonal to the wheel axis (A), wherein, in the method, the state values determined by the first sensor (S1) and the state values determined by the second sensor (S2), and/or the state values determined by the third sensor (S3) and/or the state values determined by the fourth sensor (S4) and the fifth sensor (S5) and/or control signals for actuating the first and second electric motors (M1, M2) are each converted into a single unit, the state values converted into the single unit are compared with each other, and, from the comparison, actual state values of the wheel (R) are determined.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

In order that the disclosure may be well understood, there will now be described various forms thereof, given by way of example, reference being made to the accompanying drawing, in which.

Figure 1:
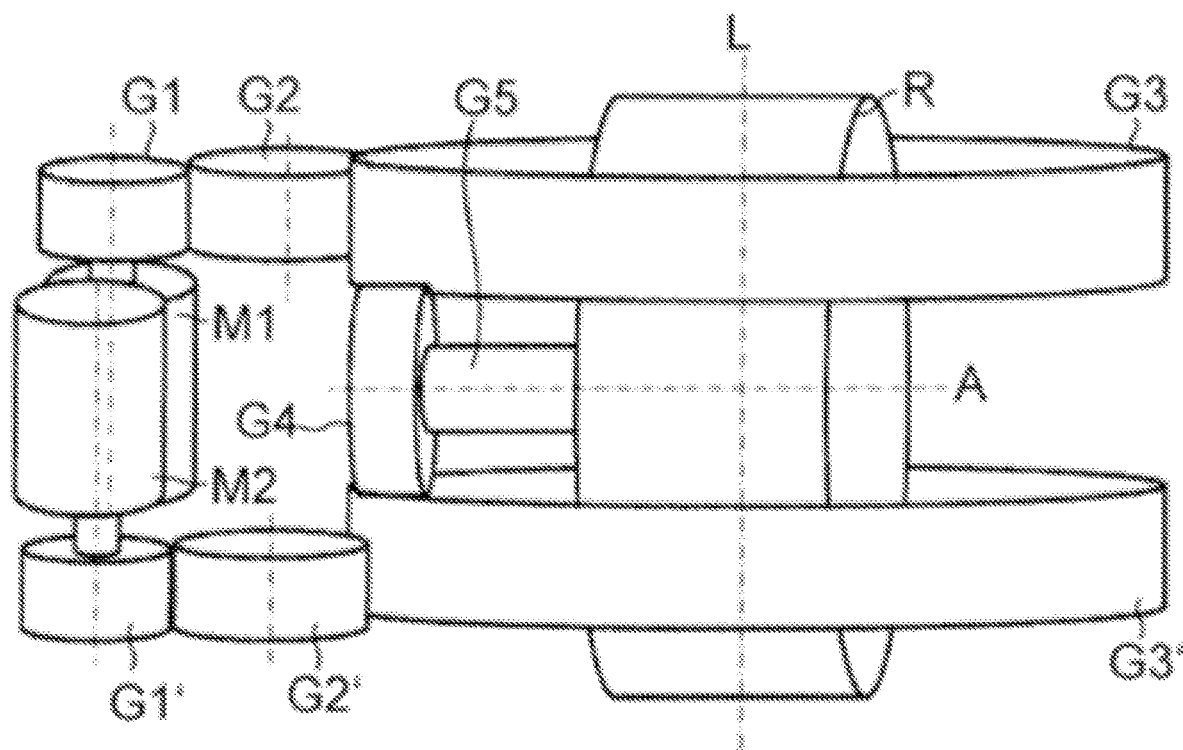
FIG. 1 shows a wheel driven by a first and a second electric motor by means of a speed modulation gearbox.

The drawings are provided herewith for purely illustrative purposes and are not intended to limit the scope of the present invention.

DETAILED DESCRIPTION

The following description is merely exemplary in nature and is in no way intended to limit the present disclosure or its application or uses. It should be understood that throughout the description, corresponding reference numerals indicate like or corresponding parts and features.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

According one aspect of the present disclosure, a method for determining state values of a wheel of a wheel drive module is proposed. In addition to the wheel, the wheel drive module comprises a speed modulation gearbox, a first electric motor and a second electric motor, as well as at least one first sensor for sensing state values of the first electric motor and at least one second sensor for sensing state values of the second electric motor. In addition, the wheel module comprises at least one third sensor for sensing state values of the wheel and/or fourth and fifth sensors, wherein the fourth sensor senses state values of the first electric motor and the fifth sensor senses state values of the second electric motor. In the wheel drive module, the first and the second electric motors are designed to drive the wheel jointly by means of the speed modulation gearbox about a wheel axis and to steer it about a steering axis orthogonal to the wheel axis. In the method, the state values determined by the first sensor and the state values determined by the second sensor and/or the state values determined by the fourth and fifth sensors and/or the state values signals determined by the third sensor and/or control signals for actuating the first and/or second electric motor(s) are converted in each case into a single and thus comparable unit. Subsequently, the state values converted into the uniform unit are compared with each other, and, from the comparison, actual state values of the wheel are determined. The plausibility of the determined state values is validated by matching or comparison with respect to one another, and it is thus ensured that the transferred state values are the actual state values of the wheel. The information or state values used for the comparison is/are thus present redundantly and can originate from multiple information sources. The information sources such as, for example, sensors or motor electronics for controlling the first and/or second electric motor(s), can also be present redundantly for this purpose.

The underlying idea here is not to have to certify and validate all the individual components of the "wheel drive module" system but only the part of the system, for example, an evaluation unit, which validates the plausibility of the state values determined by the additional components.

For this purpose, for example, the first and fourth sensors can determine a rotational speed of the first electric motor or another state value from which the rotational speed of the first electric motor can be derived, and, from the two values, an actual rotational speed of the first electric motor can be determined by the method. Analogously, from the state values determined by the second and fifth sensors, an actual state value or an actual rotational speed of the second electric motor is determined. From the actual rotational speeds of the first and second electric motors, by means of a conversion via the gear ratio of the speed modulation gearbox, the actual steering angle and the actual wheel rotational speed of the wheel can then be determined.

Alternatively, in a solution without the fourth and fifth sensors, a wheel rotational speed and/or a steering angle of the wheel can be determined with the state values of the first and second sensors, wherein, in the method, from a comparison with state values determined by the third and/or sixth sensor(s), validated and thus actual state values of the wheel are again determined.

In an embodiment variant of the method, it is provided that the actual or validated state values are an actual wheel rotational speed of the wheel about the wheel axis and an actual steering angle of the wheel about the steering axis.

Another advantageous variant of the method provides that the processed information items or information items which have been compared with each other are determined by redundantly present sensors, and, in particular, the at least one first sensor and/or the at least one second sensor and/or the at least one third sensor is/are each present multiply or redundantly.

In a likewise advantageous further development, it is advantageously provided that the at least one first sensor senses a rotor position of a rotor of the first electric motor and/or a rotational speed of the first electric motor. In addition, the at least one second sensor senses a rotor position of a rotor of the second electric motor and/or a rotational speed of the second electric motor. In the method, a calculated wheel rotational speed of the wheel about the wheel axis and/or a calculated steering angle of the wheel about the steering axis is/are subsequently determined from the rotor position of the first electric motor and of the second electric motor and/or from the rotational speed of the first and the second electric motors.

In the method, it is moreover advantageous that, in an embodiment variant, the first and the second sensors, along with the respective electric motor and the respective associated motor electronics, are each designed as a respective subassembly. In addition, it is provided here that the fourth and fifth sensors are provided or arranged on the respective electric motor outside of the respective subassembly, that is to say not as a component thereof.

The at least one third sensor preferably senses a steering angle of the wheel about the steering axis. Alternatively or additionally, an additional sixth sensor can sense the wheel rotational speed of the wheel about the wheel axis.

In another variant of the method, the calculated wheel rotational speed is compared with the wheel rotational speed sensed by the sixth sensor. Alternatively or additionally, the calculated steering angle is compared with the steering angle sensed by the third sensor.

In case of agreement between the calculated wheel rotational speed and the wheel rotational speed sensed by the sixth sensor, or in the case of a deviation between the calculated and the sensed wheel rotational speeds within a predetermined wheel rotational speed tolerance range, in the method, preferably a mean value of the calculated and the sensed wheel rotational speeds is formed as actual state value of the wheel.

Analogously, in a variant, in case of agreement between the calculated steering angle and the steering angle sensed by the third sensor, or in the case of a deviation between the calculated and the sensed steering angles within a predetermined steering angle tolerance range, a mean value of the calculated and sensed steering angles is formed as actual state value of the wheel.

If the calculated and sensed wheel rotational speeds and/or the calculated and sensed steering angles deviate too much from one another and thus are outside of the respective tolerance range, it can also be provided that a deviation message is transferred by the method.

An additional embodiment variant of the method advantageously provides that the third sensor and/or the sixth sensor is/are present at least in duplicate and that the steering angles sensed by the third sensors and/or the wheel rotational speeds sensed by the sixth sensors in each case are compared with each other. Subsequently, in case of a respective agreement with one another of the steering angle sensed by the third sensors and/or of the wheel rotational speeds sensed by the sixth sensors, or in the case of a respective deviation from one another within a predetermined steering angle tolerance range and/or wheel rotational speed tolerance range, a mean value of the sensed steering angles and/or wheel rotational speeds is formed as actual state value of the wheel. Preferably, this mean value is subsequently transferred to the respective higher-level control.

In the method, more than two state values can also be compared with one another. For example, a calculated state value can be compared with two measured state values.

The calculated state values do not have to be derived from a sensor but can instead be determined, for example, from the target rotational speeds transmitted to the electric motors.

After the determination of the actual or validated state value or of the actual or validated state values by the method, said state value(s) is/are transferred, in an advantageous further development, to an application or control electronics for the control of the wheel drive module.

In order to be able to service and individualize the wheel drive module rapidly and cost effectively, it is moreover advantageous if the wheel drive module is subdivided into additional subassemblies which can be exchanged as a modular unit. For example, along with a respective associated first or second motor control, the first and second electric motors can form a respective first or second motor subassembly.

In addition, by means of the control logic for the control of the electric motors, a method can be implemented whereby, by the control logic, for example, only a target speed or a target rotational speed of the wheel about the wheel axis and a target steering angle of the wheel about the steering axis or other state values relating to the wheel are received by the higher-level application, and, by the method, respective motor target values for the actuation of the two electric motors are determined.

Other advantageous further developments of the invention are characterized in the claims and represented in further detail below by means of the figures together with the description of one embodiment of the present disclosure provided as an example in FIGS. 1 and 2.

The figures are diagrammatic examples. Identical reference numerals in the figures refer to identical functional and/or structural features.

In FIG. 1, the wheel R, the first and second electric motors M1, M2 as well as the speed modulation gearbox G for driving and steering the wheel R by the two electric motors M1, M2 are represented. Here, by means of FIG. 1, only one possible design alternative of the drive of the wheel R about the wheel axis A and the steering axis L by the first and second electric motors M1, M2 is illustrated. For example, the wheel R can be arranged under the drive gear rings G3, G3', or the electric motors M1, M2 can have a different gear ratio on the drive gear rings G3, G3' as well as a different orientation. In the represented example, the speed modulation gearbox G comprises the pinions G1, G1', the intermediate gears G2, G2', the drive gear rings G3, G3' as well as the output gearwheel G4 and the output shaft G5. In other embodiment variants, the speed modulation gearbox G can also comprise additional components.

The first and the second electric motors M1, M2 drive the first and the second drive gear rings G3, G3'. In the embodiment shown, the first electric motor M1 is arranged opposite the second electric motor M2, wherein the electric motors M1, M2 can each comprise a separate motor transmission. The electric motors M1, M2 are in each case connected via a motor shaft to a respective pinion G1, G1'.

The first pinion G1 engages by means of its toothing in a toothing of a first intermediate gear G2 which engages by means of its toothing in a drive toothing of the first drive gear ring G3, so that, due to a rotation of the first pinion G1, the first drive gear ring G3, driven by the first electric motor M1, can be rotated about the rotation axis or steering axis L.

Analogously, the same applies to the second drive gear ring G3'. The second pinion G1' engages by means of its toothing in a toothing of a second intermediate gear G2' which engages by means of its toothing in a drive toothing of the second drive gear ring G3', whereby, by a rotation of the second pinion G1', the second drive gear ring G3', driven by the second electric motor M2, can be rotated about the rotation axis or steering axis L.

Between the first and the second drive gear rings G3, G3', an output gearwheel G4 is arranged, which engages by means of its toothing both in a toothing of the first drive gear ring G3 facing the output gearwheel G4 and also in a toothing of the second drive gear ring G3' facing the output gearwheel G4. The rotation of the output gearwheel G4 (third rotation) is consequently brought about by the rotation of the first drive gear ring G3 (first rotation) and also by the rotation of the second drive gear ring G3' (second rotation).

From the output gearwheel G4, an output shaft G5 connected in a rotationally fixed manner to the output gearwheel G4 extends along a wheel axis A in the direction of the rotation axis or the steering axis L of the drive gear rings G3, G3'. On a side spaced from the output gearwheel G4 along the wheel axis A, the wheel R is connected in a rotationally fixed manner to the output shaft G5, whereby a rotation (third rotation) of the output gearwheel G4 is transmitted via the output shaft G5 to the wheel R. As represented in sections, the wheel R is accommodated between the first drive gear ring G3 and the second drive gear ring G3', which are spaced apart along the rotation axis L thereof and define a wheel accommodation space between them. Both drive gear rings G3, G3' comprise a ring opening extending along the rotation axis L through the respective drive gear ring G3, G3'. The wheel R extends at least on the side thereof which faces the bottom through the respective ring opening, whereby the wheel R substantially comprises five sections. A first section by means of which the wheel R is arranged between the drive gear rings, two second sections by means of which the wheel R is arranged in the ring openings of the drive gear rings G3, G3', and two third sections by means of which the wheel R lies along the rotation axis L outside of the drive gear rings G3, G3'. The arrangement of the wheel R in the wheel accommodation space leads to three advantageous effects. The installation space of the wheel drive module is clearly reduced, since the wheel R, in a steering movement, does not need to rotate around the drive gear rings G3, G3', and the possible steering angle is increased, since the wheel R can be rotated 360° in the drive gear rings G3, G3' without the steering movement or rotation about the rotation axis L being limited by the intermediate gears G2, G2'. In addition, the wheel R is protected by the wheel drive module 1 or by the first and second drive gear rings G3, G3' since they form a cage around the wheel R.

Figure 2:
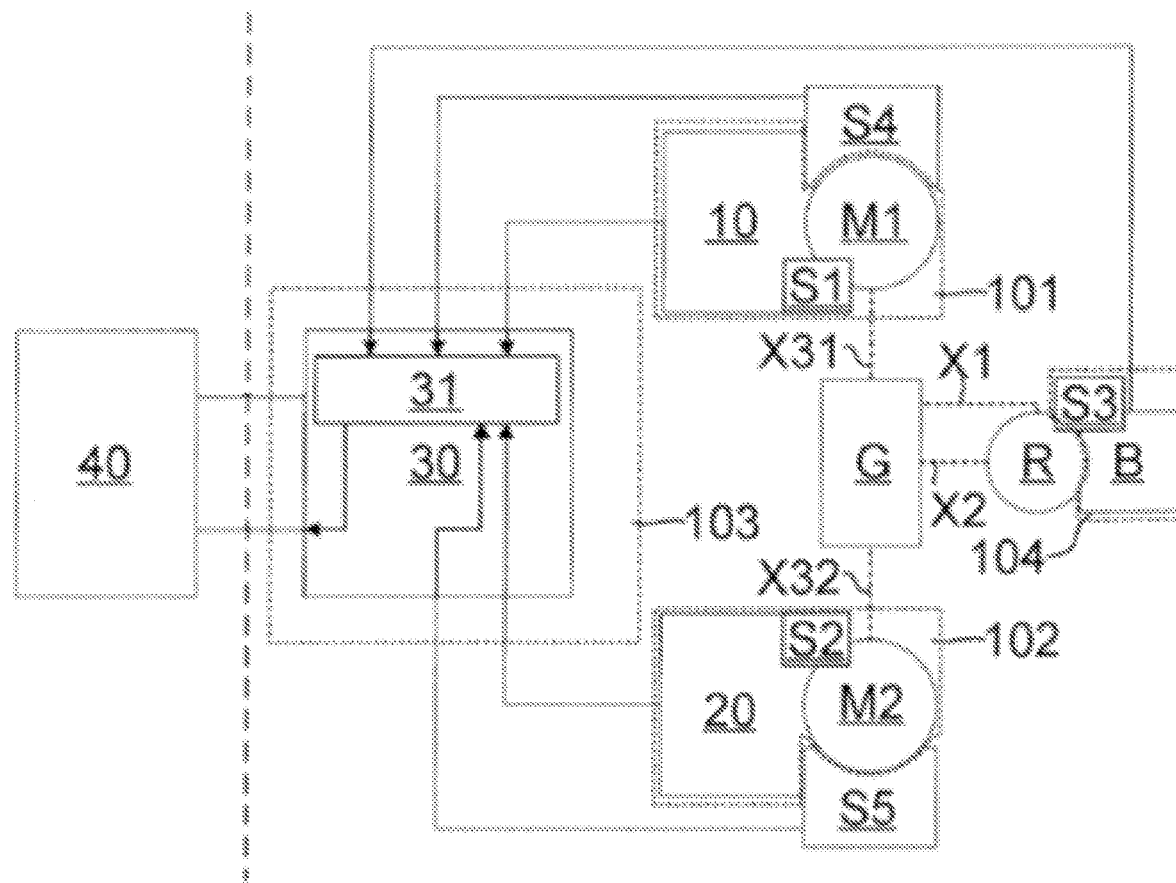
FIG. 2 shows a diagrammatic representation of the wheel drive module.

In FIG. 2, the wheel drive module is represented diagrammatically. By means of the drive of the wheel R about the steering axis L and the wheel axis A, a driving function X2 and a steering function X1 are provided on or by the wheel R. For the provision of the steering and driving functions X1, X2 by means of the speed modulation gearbox G, said speed modulation gearbox is driven by the first and second electric motors M1, M2 by means of the first and second operative connections X31, X32.

In the example shown, the first or second motor subassembly 101, 102 respectively comprises a first or a second motor electronics 10, 20 for the direct actuation of the respective electric motor M1, M2 as well as a first or a second sensor S1, S2 by means of which motor values such as, for example, the rotor position of the respective electric motor M1, M2, are determined. In the embodiment shown, the first or second sensor S1, S2 is coupled directly to the respective motor electronics 10, 20, wherein the motor values determined by the sensors S1, S2 are used for the control of the respective electric motor M1, M2, and, if necessary, the motor values can also be transmitted to other subassemblies.

The first and second motor subassemblies 101, 102 are connected via bus lines symbolized by solid lines to the central subassembly 103 which comprises a central electronics 30.

In the embodiment shown in FIG. 2, for the control of the electric motors M1, M2, a fourth or fifth sensor S4, S5 for sensing the rotational speed of the electric motors is additionally provided on the electric motors M1, M2. The fourth sensor S4 is associated with the first electric motor M1 but not part of the first motor subassembly 101, and the fifth sensor S5 is associated with the second electric motor M2 but not part of the second motor subassembly 102. In the embodiment shown, the fourth and fifth sensors S4, S5 are each connected to the central electronics 30.

In order to be able to reach a safe state in case of a defect of the first or second electric motor M1, M2, a safety brake B is additionally provided, which can be combined with a third sensor S3 to form a brake subassembly 104. By means of the safety brake B, at least the driving function X2 can be blocked or the rotation of the wheel R about the wheel axis A can be braked, so that the wheel drive module or the wheel R is brought to a standstill and a safe state can be established. The third sensor S3 here directly senses state values of the wheel R such as, for example, the steering angle of the wheel R about the steering axis L, wherein the rotation speed or the rotational speed of the wheel R about the wheel axis A can be sensed by a sixth sensor which is not shown. Via the connection of the brake subassembly 104 to the central electronics 30, the sensed values are made available or transferred to this subassembly or to the additional subassemblies.

In order to carry out the method, an evaluation unit 31 or a safety chip is integrated in the represented central electronics 30, in which certain state values are compared in order to determine the actual or validated state values of the wheel R and transfer them to the application electronics 40.

In the examples shown, the respective rotational speed of the electric motors M1, M2 is determined from the state values of the first and second electric motors M1, M2 determined by the first and second sensors S1, S2. The rotational speeds of the electric motors M1, M2 which were determined by the first and second sensors S1, S2 can subsequently be compared with the rotational speeds measured directly by the fourth and fifth sensors S4, S5. After the comparison or else directly, the rotational speed of the wheel R and a steering movement which occurs can be determined from the rotational speeds of the first and second electric motors M1, M2 and via the gear ratio provided by the speed modulation gearbox, and, in the case of a continuous determination, a steering angle of the wheel R can also be determined from the steering movement. In addition, the determined rotational speed of the wheel R can subsequently be compared by the evaluation unit 31 with the rotational speed of the wheel R measured by the third sensor S3. If no deviation occurs or if a deviation within a certain tolerance range occurs, a mean value is formed from the measured rotational speed and the determined rotational speed, and the mean value of the rotational speeds is transferred as validated or actual state value or as actual rotational speed to the application electronics 40.

Since the plausibility of the rotational speed of the wheel R is validated before the transfer by the evaluation unit 31, it is not necessary to use especially reliable components for the sensing of the state values themselves.

While the above description constitutes the preferred embodiments of the present invention, it will be appreciated that the invention is susceptible to modification, variation and change without departing from the proper scope and fair meaning of the accompanying claims

The invention claimed is:

1. A method for controlling a wheel drive module of a vehicle; the method comprising:
providing the wheel drive module, the wheel drive module comprising a wheel (R), a speed modulation gearbox (G), a first electric motor (M1) and a second electric motor (M2), as well as at least one first sensor (S1) for sensing state values of the first electric motor (M1) and at least one second sensor (S2) for sensing state values of the second electric motor (M2),
determining state values of the wheel (R) of the wheel drive module,
wherein the first and the second electric motors (M1, M2) are designed to drive the wheel (R) jointly by means of the speed modulation gearbox (G) about a wheel axis (A) and to steer it about a steering axis (L) orthogonal to the wheel axis (A),
wherein the wheel drive module furthermore comprises at least one third sensor (S3) for sensing state values of the wheel (R), and/or a fourth and fifth sensor (S4, S5), and the fourth sensor (S4) senses state values of the first electric motor (M1), and the fifth sensor (S5) senses state values of the second electric motor (M2), so that the wheel drive module in a first configuration comprises at least one first sensor (S1), at least one second sensor (S2) and at least one third sensor (S3), the wheel drive module in a second configuration comprises at least one first sensor (S1), at least one second sensor (S2), as well as the fourth and fifth sensor (S4, S5), and the wheel drive module in a third configuration comprises at least one first sensor (S1), at least one second sensor (S2), at least one third sensor (S3), as well as the fourth and fifth (S4, S5),
wherein, in determining state values of the wheel drive module in the first configuration, the state values determined by the first sensor (S1) and the state values determined by the second sensor (S2), as well as the state values determined by the third sensor (S3) and optional control signals for actuating the first and second electric motors (M1, M2) are each converted into a uniform unit,
wherein, in determining state values of the wheel drive module in the second configuration, the state values determined by the first sensor (S1) and the state values determined by the second sensor (S2) as well as the state values determined by the fourth sensor (S4) and the fifth sensor (S5) and optional control signals for actuating the first and second electric motors (M1, M2) are each converted into a uniform unit,
wherein, in the method for determining state values of the wheel drive module in the third configuration, the state values determined by the first sensor (S1) and the state values determined by the second sensor (S2) as well as the state values determined by the third sensor (S3) as well as the state values determined by the fourth sensor (S4) and the fifth sensor (S5) and optional control signals for actuating the first and second electric motors (M1, M2) are each converted into a uniform unit,
wherein the state values converted into the uniform unit are compared with each other, and, from the comparison, actual state values of the wheel (R) are determined and controlling the wheel drive module using the actual state values; and
transferring the actual state values to an application or control electronics; the application or control electronics using the actual state values to control the wheel drive module.

2. The method according to claim 1, wherein the actual state values are an actual wheel rotational speed of the wheel (R) about the wheel axis (A) and an actual steering angle of the wheel (R) about the steering axis (L).

3. The method according to claim 2, wherein the at least one first sensor (S1) and/or the at least one second sensor (S2) and/or the at least one third sensor (S3) are each present multiply.

4. The method according to claim 3, wherein the at least one first sensor (S1) senses a rotor position of a rotor of the first electric motor (M1) and/or a rotational speed of the first electric motor (M1), and
the at least one second sensor (S2) senses a rotor position of a rotor of the second electric motor (M2) and/or a rotational speed of the second electric motor (M2), and,
in the method, from the rotor position of the first electric motor (M1) and of the second electric motor (M2) and/or from the rotational speed of the first and the second electric motors (M1, M2), a calculated wheel rotational speed of the wheel (R) about the wheel axis (A) and/or a calculated steering angle of the wheel (R) about the steering axis (L) is/are determined.

5. The method according to claim 4, wherein the first and the second sensors (S1, S2), along with the respective electric motor (M1, M2) and the respective associated motor electronics (10, 20), are each designed as a respective subassembly, and the fourth and fifth sensors (S4, S5) are arranged on the respective electric motor (M1, M2) outside of the respective subassembly.

6. The method according to claim 5, wherein the at least one third sensor (S3) senses a steering angle of the wheel (R) about the steering axis (L), and/or a sixth sensor senses a wheel rotational speed of the wheel (R) about the wheel axis (A).

7. The method according to claim 6, wherein, in case of agreement between the calculated steering angle and of the steering angle sensed by the third sensor (S3), or in the case of a deviation between the calculated and the sensed steering angles within a predetermined steering angle tolerance range, a mean value of the calculated and sensed steering angles is determined as actual state value of the wheel (R).

8. The method according to claim 7, wherein the third sensor (S3) and/or the sixth sensor is/are present at least in duplicate, the steering angles sensed by the third sensors (S3) and/or the wheel rotational speeds sensed by the sixth sensors are in each case compared with each other,
in the case of a respective agreement between the steering angles sensed by the third sensors (S3) and/or of the wheel rotational speeds sensed by the sixth sensors, or in the case of a respective deviation from one another within a predetermined steering angle tolerance range and/or wheel rotational speed tolerance range, a mean value of the sensed steering angles and/or wheel rotational speeds is formed as actual state value of the wheel (R).

9. The method according to claim 8, wherein the actual state values of the wheel (R) are transferred to an application for the control of the wheel drive module.

10. The method according to claim 6, wherein the calculated wheel rotational speed is compared with the wheel rotational speed sensed by the sixth sensor, and/or the calculated steering angle is compared with the steering angle sensed by the third sensor (S3).

11. The method according to claim 10, wherein in case of agreement with one another of the calculated wheel rotational speed and of the wheel rotational speed sensed by the sixth sensor, or in the case of a deviation from one another of the calculated and the sensed wheel rotational speeds within a predetermined wheel rotational speed tolerance range, a mean value of the calculated and sensed wheel rotational speeds is formed as actual state value of the wheel (R).

12. The method according to claim 1, wherein the at least one first sensor (S1) and/or the at least one second sensor (S2) and/or the at least one third sensor (S3) are each present multiply.

13. The method according to claim 12, wherein the third sensor (S3) and/or the sixth sensor is/are present at least in duplicate, the steering angles sensed by the third sensors (S3) and/or the wheel rotational speeds sensed by the sixth sensors are in each case compared with each other,
in the case of a respective agreement between the steering angles sensed by the third sensors (S3) and/or of the wheel rotational speeds sensed by the sixth sensors, or in the case of a respective deviation from one another within a predetermined steering angle tolerance range and/or wheel rotational speed tolerance range, a mean value of the sensed steering angles and/or wheel rotational speeds is formed as actual state value of the wheel (R).

14. The method according to claim 1, wherein the at least one first sensor (S1) senses a rotor position of a rotor of the first electric motor (M1) and/or a rotational speed of the first electric motor (M1), and
the at least one second sensor (S2) senses a rotor position of a rotor of the second electric motor (M2) and/or a rotational speed of the second electric motor (M2), and,
in the method, from the rotor position of the first electric motor (M1) and of the second electric motor (M2) and/or from the rotational speed of the first and the second electric motors (M1, M2), a calculated wheel rotational speed of the wheel (R) about the wheel axis (A) and/or a calculated steering angle of the wheel (R) about the steering axis (L) is/are determined.

15. The method according to claim 1, wherein the first and the second sensors (S1, S2), along with the respective electric motor (M1, M2) and the respective associated motor electronics (10, 20), are each designed as a respective subassembly, and the fourth and fifth sensors (S4, S5) are arranged on the respective electric motor (M1, M2) outside of the respective subassembly.

16. The method according to claim 1, wherein the at least one third sensor (S3) senses a steering angle of the wheel (R) about the steering axis (L), and/or a sixth sensor senses a wheel rotational speed of the wheel (R) about the wheel axis (A).

17. The method according to claim 16, wherein, in case of agreement between the calculated steering angle and of the steering angle sensed by the third sensor (S3), or in the case of a deviation between the calculated and the sensed steering angles within a predetermined steering angle tolerance range, a mean value of the calculated and sensed steering angles is determined as actual state value of the wheel (R).

18. The method according to claim 1, wherein the calculated wheel rotational speed is compared with the wheel rotational speed sensed by the sixth sensor, and/or the calculated steering angle is compared with the steering angle sensed by the third sensor (S3).

19. The method according to claim 18, wherein in case of agreement with one another of the calculated wheel rotational speed and of the wheel rotational speed sensed by the sixth sensor, or in the case of a deviation from one another of the calculated and the sensed wheel rotational speeds within a predetermined wheel rotational speed tolerance range, a mean value of the calculated and sensed wheel rotational speeds is formed as actual state value of the wheel (R).

20. The method according to claim 1, wherein the actual state values of the wheel (R) are transferred to an application for the control of the wheel drive module.

* * * * *